(12) United States Patent
Calman et al.

(10) Patent No.: US 7,971,059 B2
(45) Date of Patent: Jun. 28, 2011

(54) SECURE CHANNEL FOR IMAGE TRANSMISSION

(75) Inventors: Matthew Alexander Calman, Charlotte, NC (US); William Scott Treadwell, Warrenton, VA (US)

(73) Assignee: Bank of America Corporation, Charlotte, NC (US)

( * ) Notice: Subject to any disclaimer, the term of this patent is extended or adjusted under 35 U.S.C. 154(b) by 1063 days.

(21) Appl. No.: 11/755,543

(22) Filed: May 30, 2007

(65) Prior Publication Data

US 2008/0301441 A1 Dec. 4, 2008

(51) Int. Cl.
*H04L 9/00* (2006.01)
(52) U.S. Cl. ............ 713/168; 726/26; 726/22; 713/169; 713/170
(58) Field of Classification Search .................. None
See application file for complete search history.

(56) References Cited

U.S. PATENT DOCUMENTS

| | | | |
|---|---|---|---|
| 5,880,769 A | 3/1999 | Nemirofsky et al. | |
| 6,654,883 B1 | 11/2003 | Tatebayashi | |
| 7,392,935 B2 * | 7/2008 | Byrne et al. .................. | 235/379 |
| 2003/0024978 A1 | 2/2003 | Young et al. | |
| 2006/0065786 A1 | 3/2006 | Huber et al. | |
| 2006/0249567 A1 | 11/2006 | Byrne et al. | |
| 2006/0291406 A1 | 12/2006 | Booth et al. | |

FOREIGN PATENT DOCUMENTS

EP 1564624 A2 * 8/2005

OTHER PUBLICATIONS

PCT International Preliminary Report on Patentability, PCT/US2008/065095, mailed Dec. 10, 2009, 12 pages.
PCT International Search Report mailed May 3, 2009, PCT/US2008/065095, 16 pages.
Wachovia Newsletter—What's Ahead, 2 pages, http://www.wachovia.com/wnewsletter/article/printer/0,,49_125_1,00.html, downloaded Apr. 8, 2007.
Lemos, Robert, "Hardware Security Sneaks into PCs", downloaded from http://news.com/Hardware+security+sneaks+into+PCs/2100-7355_3-5619035.html, last modified Mar. 16, 2005.
Evers, Horis, New Security Proposed for Do-it-All Phones, downloaded from http://news.com/New+security+for+do-it-all+phones/2100-1037)3-5883341.html, last modified Sep. 27, 2005.
Bank Systems Technology, "Report Shows Diversity in Check-Image Archives at Major Banks' Web Sites," Feb. 22, 2007 downloaded from http://www.banktech.com/showArticle.jhtml?articleID=197007866.

(Continued)

*Primary Examiner* — Nasser Moazzami
*Assistant Examiner* — Fikremariam Yalew
(74) *Attorney, Agent, or Firm* — Banner & Witcoff, Ltd.; Michael A. Springs (57) ABSTRACT

Systems, devices, and methods for establishing a secure session for the transmission of data from an input device to a remote server device is disclosed. The input device may be an electronic check scanner attached to a banking customer's home personal computer. The customer may visit a bank's Internet website using the web browser or other application on their personal computer, and then submit scanned images of check to the bank. The bank, however, to ensure security and prevent fraud, may wish to establish a secure session between the devices and components in the system before the image data may be scanned and transmitted.

13 Claims, 4 Drawing Sheets

OTHER PUBLICATIONS

Larson, Don, "The Race to Secure Cyberspace", downloaded from http://www.webdeveloper.com/security_race_cyberspace.html, Feb. 25, 2007.

FAQ, Technical Support, downloaded from http://www.twain.org/faq.html, Feb. 26, 2007.

"CS 470/180, Compact Countertop Check Scanners", downloaded from http://www.visionshape.com/CS-370-380-p1.html, Feb. 26, 2007.

Bank Systems Technology, "Wells Fargo Offers Internet-Based Remote Deposit Capture", modified Mar. 29, 2005, downloaded from http://www.bantech.com/showArticle.jhtml?articleID=159907879.

"Fact Sheet 30: Check 21: Paperless Banking"; downloaded from http:www.privacyrights.org/fs/fs30-check21.html, Feb. 26, 2007.

Bontchev, Vesselin, Current Status of the CARO Malware Naming Scheme, downloaded from http://www.people-frisk-software.com/~bontchev/papers/naming.html, Feb. 28, 2007.

Young, Deborah; "Internet trailblazing: Deposit Checks Right From Your Desktop", Sep. 2005, downloaded from http://www.treasuryandrisk.com/advertise/WellsFargo_sep05.pdf.

Network Access Control: User and Device Authentication; Intgel, Aug. 2005, downloaded from http://www.intelcom/it/pdf/network-access-control.pdf.

* cited by examiner

SECURE CHANNEL FOR IMAGE TRANSMISSION

FIELD OF THE INVENTION

Aspects of the disclosure relate to security. More specifically, aspects of the disclosure relate to securing a communication channel for an image transmission.

BACKGROUND

A new banking law, the Check Clearing for the 21st Century Act ("Check 21 Act"), took effect in October 2004. The Check 21 Act permits banks and institutions to substitute a paper check with a substitute check bearing a reprint of an electronic image of the check to create a legally binding transaction. The Check 21 Act also created an environment where banks and their customers could exchange check images in lieu of paper checks to negotiate payments and deposits. Prior to the enactment of the Check 21 Act, financial institutions and businesses were required to collect, bundle, and submit paper checks to the respective issuing banks at the end of the business day. In some instances a financial institution were required to make multiple courier runs each day to submit collected paper checks to a check processing facility. This process was time-consuming, inefficient, and cost-ineffective.

In some instances a check processing facility provided financial institutions and/or businesses with computer software. The computer software was installed on a computer located at the financial institution or business and was used to transmit images of paper checks to a remote server with large data storage capabilities. Under this arrangement, the financial institutions and businesses have to deal with the added step of installing and updating the software on their computers whenever a new version of the software is released. Moreover, the software creates a heavy memory footprint on the computer.

Furthermore, in an effort to reduce the support costs and heavy memory footprint of fat-client software required to be present on a computer's hard drive, check image submission software has also been provided through an Internet web browser. In such a thin-client configuration, the functionality of the submission software is provided to the user through an Internet web browser, but the software code resides on a sever computer at a remote location. Once a user authenticates himself/herself using the web browser interface, the user can submit check images and check image data to a remote banking webserver through the web browser. A thin-client configuration results in a smaller memory footprint on a client computer. Also, a thin-client configuration alleviates the added step of individually installing fat-client software on computers located at the financial institutions and businesses. However, in industries such as banking where security is of a major importance, a thin-client configuration poses some security risks.

Since the aforementioned configuration permits any authorized user to access online banking functionality from any Internet-accessible computer with a web browser, there is a need in the art to provide systems and methods with added security to the sensitive banking data being transmitted.

BRIEF SUMMARY

Aspects of the present disclosure address one or more of the issues mentioned above by disclosing systems, devices, and methods for establishing a secure communication between an image acquisition device and a remote server computer (e.g., banking website computer). The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment, a system is disclosed comprising an image input device, a personal computing device connected to the image input device, and a server computing device in communication with the image input device over a network and through the personal computing device. The image input device may comprise a memory storing computer-executable instructions and an integrity status indicator. The personal computing device comprises a memory storing computer-executable instructions and a processor for executing those instructions. The server computing device comprises memory storing information corresponding to an Internet-accessible webpage and a processor for receiving and sending information and data.

In another embodiment, an image input device is disclosed comprising a sensor, memory, and processor. The memory stores an integrity status indicator and image data, and may include non-volatile memory. The device stores computer-executable instructions to perform a method of performing a self-test to verify integrity and update a status indicator accordingly. In one embodiment, the image input device may include a housing to prevent tampering with the computer-executable instructions stored in the memory.

In yet another embodiment, a method is disclosed for receiving one or more indications, initiating a secure scanning session, receiving image data over the secure session, and storing the image data on a storage unit. The indications may be used to indicate the integrity of different components and connections between components in a system in accordance with aspects of the invention. In some embodiments, a user may provide login information and be authenticated. Subsequently, image data may be associated with the user when stored on the storage unit.

In another embodiment in accordance with aspects of the disclosure, aspects of the invention may be provided in a computer-readable medium. For example, an electronic check scanner may contain a computer-readable medium comprising computer-executable instructions to perform one or more of the method steps describe herein.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
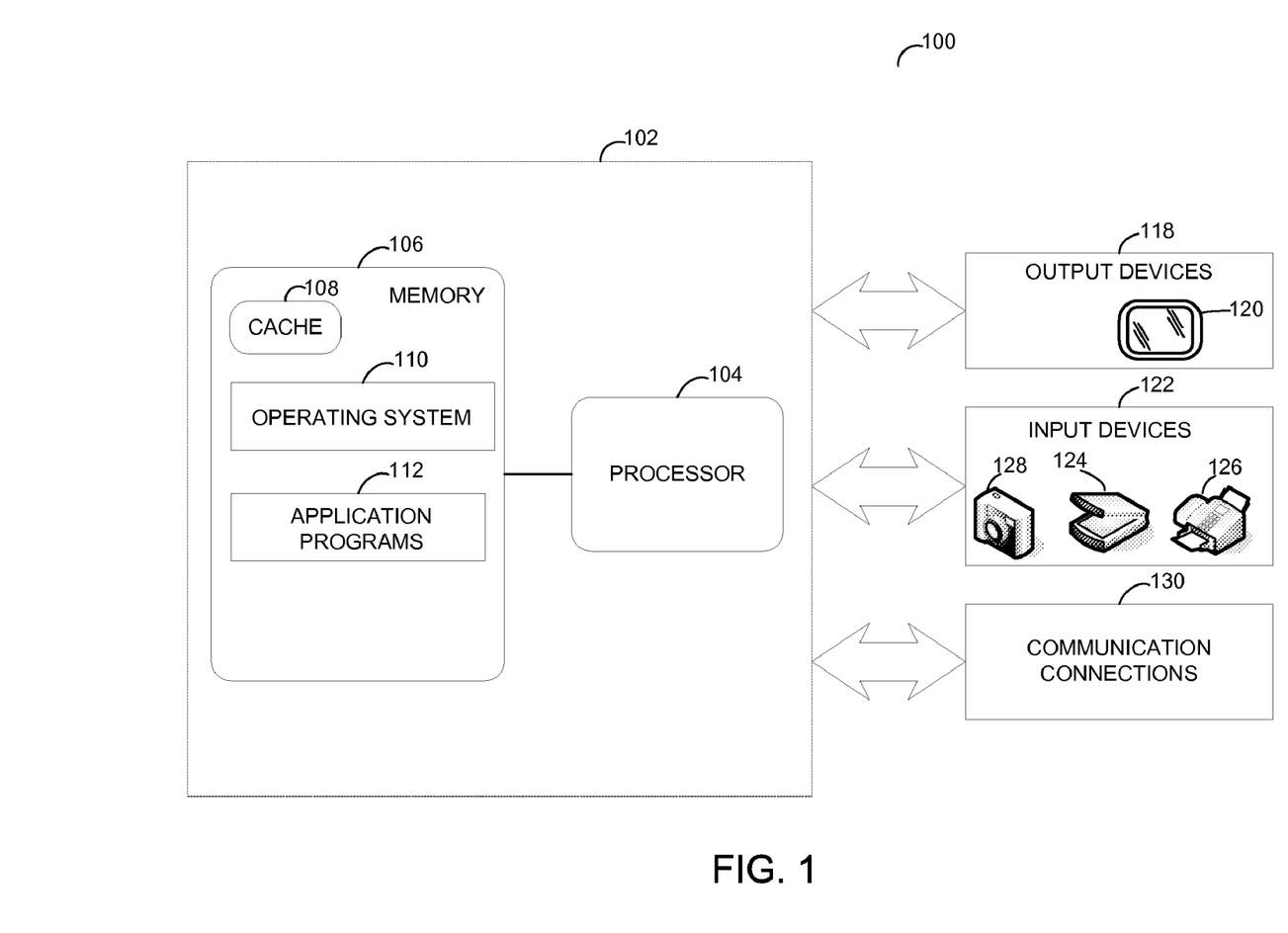
FIG. 1 depicts an illustrative personal computing device with peripheral devices in accordance with various aspects of the invention.

An example of an illustrative personal computing system 100 in which various aspects and embodiments of the invention may be implemented is shown in the simplified diagram in FIG. 1. The features of such a device are well-known to those of skill in the art and need not be described at length here. The illustrative system 100 is only one example of a suitable system and is not intended to suggest any limitation as to the scope of use or functionality of the invention. Suitable computing environments for use with the invention include a computing device 102 or system that support interaction with an input devices 122 (e.g., digital camera 128, document scanner 124, multi-function office device 126, etc.), output devices 118 (e.g., visual display 120), and communication connections 130 (e.g., Ethernet connection, IEEE 802.11, dial-up connection, etc.). The communication connections 130 may be used to allow the computing device 102 to communicate with other devices. With reference to FIG. 1, a computing device 102 commonly includes a memory 106 and a processor 104 (e.g., an Intel microprocessor).

Programs, comprising sets of instructions and associated data, may be stored in the memory 106, from which they can be retrieved and executed by the processing unit 103. Among the programs and program modules stored in the memory 106 are those that comprise or are associated with an operating system 110 as well as application programs 112. Application programs 112, such as a malware detection system, web browser application, Java runtime environment, and others, and an operating system 110 are commonly installed in a computing device 102. The memory 106 may also include a cache 106 to enhance device performance. Computing system 100 includes forms of computer-readable media. Computer-readable media include any available media that can be accessed by the computing device 102. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Figure 2:
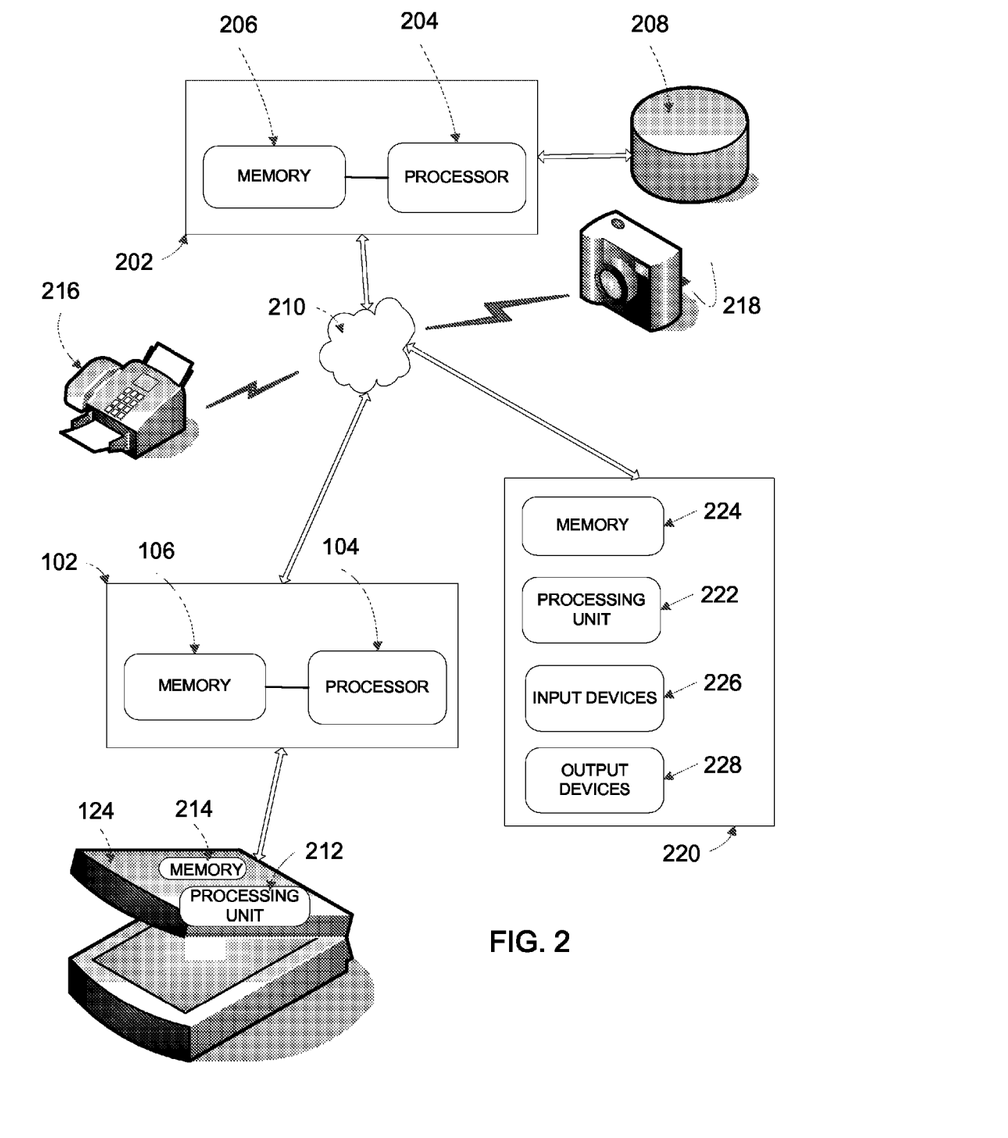
FIG. 2 shows an illustrative operating environment in accordance with various aspects of the invention.

FIG. 2 depicts a simplified, illustrative operating environment for implementing various aspects and embodiments of the invention. The illustrative operating environment in FIG. 2 is only one example of a suitable operating scenario and is not intended to suggest any limitation as to the scope of use or functionality of the invention.

Numerous image input devices that are unique are illustrated in FIG. 2. For example, an image input device (e.g., electronic paper check scanner 124) comprising a memory 214 and a processing unit 212 may be used to capture an image of a check or other document (e.g., contracts, forms, applications, etc.). The image input device's memory 214 may store computer-executable instructions and/or an integrity status indicator value. In one embodiment, the integrity status indicator may simply be a programming variable in the software running on the image input device 124. For example, a Boolean type variable may be used to hold a value of TRUE in the memory 214 when the image input device 124 is not infected with malware. Likewise, the integrity status indicator holds a value of FALSE in the memory 214 when the self-test fails to verify the integrity of the memory 214. In one example, the self-test fails when a housing storing the memory 214 has been tampered. The housing may be configured to restrict physical access to the memory 214 of the image input device 124 in order to prevent a malicious user from manually inserting malware into the device 124. Some examples of malware include, but are not limited to, a virus, dropper, intended, trojan, password stealer, dialer, backdoor, exploit, tool and garbage.

The memory 214 of the image input device 124 may also include computer-executable instructions that may be executed using a processing unit 212 in the image input device 124. The computer-executable instructions may be used to perform a method. The method may include the step of performing the self-test and then updating the value of the integrity status indicator according to the outcome of the self-test. The method may also include sending the integrity status indicator value to another device (e.g., personal computing device 102). In one embodiment in accordance with aspects of the invention, the computer-executable instructions include firmware for execution by the processing unit 212. Firmware may include a TWAIN driver or other drivers that are useful for controlling access to the image input device. The firmware may be stored in a non-volatile memory area in the memory 214 of the image input device 124. At least one benefit of storage in a non-volatile memory area (e.g., flash memory, EEPROM, ROM, etc.) is that the contents of the non-volatile memory area are not inadvertently erased if power to the device 124 is lost.

In accordance with aspects of the invention, the image input device may be comprised of an electronic check scanner device, a digital camera 218, multi-purpose office machine 216, or any other device that permits the capturing of an image using a sensor (e.g., an optical sensor). These image input devices 122 may store the image data they capture into a portion of the memory 214 in the input device 124. In addition, in various embodiments in accordance with aspects of the invention, the image input device 122 may stored a unique identifier (e.g., an IP address) corresponding to the device (e.g., document scanner 124, multi-purpose office machine 126, digital camera 128, electronic paper check scanner, etc.) As such, the image input device 122 may be identifiable and addressable by a device external to this process. At least one benefit of such a configuration is that an external device, such as a remote computing device 202 can communicate with these image input devices 122 using their unique, addressable identifiers.

In accordance with various aspects of the invention, illustrated in FIG. 2 is a server computing device 202 in communication with various image input devices (e.g., image input device 124, IP-addressable digital camera 218, multi-function office machine 216, and automated teller machine 220) over a network 210. In one embodiment, the server computing device 202 communicates through a personal computing device 102 in order to send/receive information to/from an image input device 124. One skilled in the art will appreciate that the network 210 may be any of the Internet, wide area network (WAN), local area network (LAN), wireless LAN (e.g., a LAN using IEEE 802.11, a Bluetooth network, etc.) or any other telecommunications network (e.g., satellite, cable, dial-up, etc.) that permits communication between remote computing devices. Furthermore, the network 210 may include wired and/or wireless communication. For example, in one embodiment, image input device 124 may communicate wirelessly with server computing device 202, like the various other devices 216, 218 depicted in FIG. 2. One skilled in the art will appreciate that one or more combinations of the various embodiments depicted in FIG. 2 are contemplated by the disclosure and appreciated by those of ordinary skill in the art from review of the entirety disclosed herein.

The server computing device 202 may be comprised of a memory 206 for storing information corresponding to an Internet-accessible webpage. In some embodiments, the webpage may be provided as hypertext markup language (HTML), Javascript, applets, or any other web technology. In such embodiments, the server computing device 202 may be a web server that sends these webpages in response to a request for information. In some embodiments, the information sent to by the server computing device 202 may include downloadable web browser plug-ins, Microsoft ActiveX controls, or other types of computer-executable instructions that may be provided in a thin-client configuration to enable functionality at the client-side (i.e., at the personal computing device 102).

Although the server computing device 202 has been described as a web server or Internet-accessible server, one skilled in the art will appreciate that the server computing device 202 is not limited to a single machine or device. Rather, the term refers to any system of computers and/or devices (e.g., firewalls, routers, caching systems, proxy servers, etc.) that may be used to provide access to services and features available for access by users. As such, different reference to the term performing particular steps does not require that the same machine/device perform all the steps.

The request for information may be in the form of an HTTP request or any other acceptable request for information (e.g., HTTPS, etc.). In one example, a personal computing device 102 may receive image data from an image input device 124 (e.g., an electronic paper check scanner such as the Visionshape CS 470/480 compact countertop check scanner) and send the image data to the server computing device 202. After receiving the image data, the server computing device 202 may save the image data of the check in a data storage unit 208. In one example, the data storage unit 208 may be an enterprise database. In another example, the data storage unit 208 may be implemented as a high-capacity network storage device where the images are saved in a directory/subdirectory structure. A processor 204 may also be provided in the server computing device 202 to assist in sending and receiving information and data, as described above.

Furthermore, in accordance with various aspects of the invention, the server computing device 202 may have line-of-sight to the image input device 124. The server computing device 202 may communicate directly with the image input device 124 to authenticate the device 124. By directly communicating with the image input device 124 the server computing device 202 enhances the security of the communication channel from the image input device 124. In addition, the server computing device 202 may verify that a handshake was performed between the personal computing device 102 and the image input device 124 prior to any image data transmissions. Moreover, the server computing device 202 may verify that the personal computing device 102 is up-to-date in terms of scanning for malware. These and other aspects of the invention are described in greater detail throughout the disclosure.

In accordance with various aspects of the invention, illustrated in FIG. 2 is a personal computing device 102 in communication with an image input device 124. The personal computing device 102 may be a banking customer's PC at their place of residence or business, and the image input device 124 may be a flatbed scanner or a specialized check scanner in accordance with aspects of the invention. The personal computing device 102 may have a web browser (or other thin-client application) installed. One skilled in the art will appreciate that in some embodiments where the personal computing device 102 is a handheld device (e.g., a personal digital assistant such as a Treo or Blackberry), a modified web browser (for handheld devices) or other thin-client application is contemplated for use with the invention.

The personal computing device 102 may be comprised of a memory 106 storing computer-executable instructions and a processor 104 for executing the instructions. The instructions may direct the personal computing device 102 to send a request for image data to the image input device 124. In response the image input device 124 may send image data and the integrity status indicator value to the personal computing device 102. As explained earlier, the integrity status indicator value may indicate whether or not the memory 214 or logic units 212 of the image input device 124 contains malware or has been tampered (i.e., maliciously altered.) In some embodiments, the image input device 124 will not send image data if the integrity status indicator value shows a failed state. In other embodiments, the image data may be sent to the personal computing device 102 or webserver 202, and the personal computing device 102 or webserver 202 may choose to keep or discard the image data according to the value of the integrity status indicator value.

In accordance with aspects of the invention, malware detection software may be run on the memory 106 in the personal computing device 102. Some examples of companies that provide malware detection software include, but are not limited to, Symantec, Microsoft, Computer Associates, and others. The malware detection software may generate a datafile that is stored in the memory 106 of the personal computing device 102 that indicates whether the personal computing device 102 includes malware. The malware detection software may generate a timestamp value that is stored in the memory 106 of the personal computing device 102 that indicates when the malware detection software was last run on the person computing device 102. For example, the creation date of the datafile may be used to determine the timestamp value. In other embodiments, a text string corresponding to the actual timestamp value may be saved in the datafile (or a separate file). In one embodiment in accordance with aspects of the invention, the datafile (or comparable file) may be validated to ensure that malware detection software has been run on the personal computing device 102 within a predetermined amount of time (e.g., in the last week, in the last 24 hours, etc.) Additionally, the malware detection software may be interrogated to report when it was last updated to ensure new threats are being detected. Thus, the system may optionally wish to ensure that even the malware detection software itself is updated regularly to keep up with the introduction of new threats.

The image input device 124 connected to the personal computing device 102 may perform an electronic handshake with the personal computing device 102 to establish a secure communication channel between the two devices. One skilled in the art will appreciate that many different electronic handshaking techniques exist in the art for establishing a communication channel. The image input device 124 may contain computer-executable instructions in memory 214 (e.g., in a non-volatile memory area) to enable the device 124 to perform an electronic handshake. In one embodiment, to establish the secure connection, image input device 124 and personal computing device 102 may exchange data (e.g., parameters) relating to data transmission protocols and memory conditions to indicate to both devices that a trustworthy environment exists. In one embodiment, both devices may exchange an algorithmically derived data token to assure no malware was present and/or that no tampering (or in-line device) was present. Other data might be exchanged that would pre-authorize communications from webserver 202 to image input device 124 to enable data encryption between them.

Figure 3:
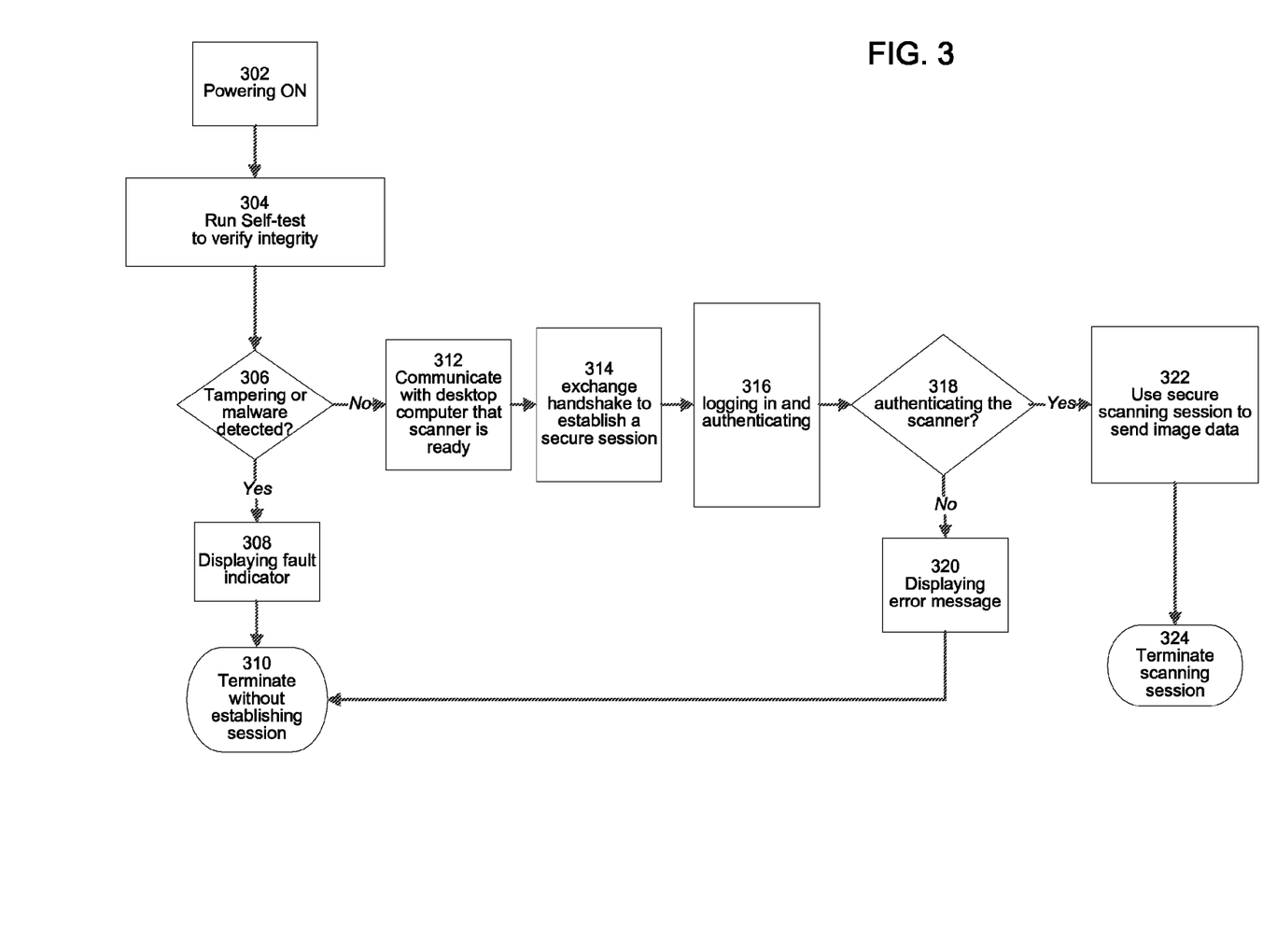
FIG. 3 shows a flowchart illustrating a method for securing a communication channel for an image transmission in accordance with various aspects of the invention.

FIG. 3 shows a flowchart illustrating a method for securing a communication channel for an image transmission in accordance with various aspects of the invention. When the image input device 124 (e.g., scanner) is powered ON (in step 302), a processing unit 212 in the image input device 124 automatically executes computer-executable instructions in the memory 214 to perform a self-test on the integrity of the device. Testing the integrity of the image input device 124 may include in some embodiments detecting (in step 304) the presence of malware or tampering in the critical components of the device 124. Some examples of critical components include, but are not limited to, firmware, computer-executable instructions in memory 214, camera, power supply, housing, and others. In one embodiment, the image input device 124 may be configured with a set of shadow firmware to compare against the firmware executed on the image input device 124 to determine whether it has been tampered with or infected with malware. The shadow firmware may be stored in an encrypted form in a protected area in memory 214 during factory installation and caused to be immutable (e.g., stored in a form of read-only memory). In various embodiments, the power consumption of the image input device 124 may be measured from the power bus of the device 124 to ascertain if any hardware tampering and/or add-on devices have been installed to cause the power consumption to vary from factory specifications. One skilled in the art will appreciate that although some techniques have been described herein for performing step 304, aspects of the invention are not limited to these self-tests. Rather, other techniques are known in the art for performing a self-test on the image input device 124 and are contemplated for use in various embodiments of the invention by the disclosure.

If the integrity of the device 124 is compromised (in step 306), then the device 124 may display a fault indicator (in step 308). Example of fault indicators may be a visual indicator such as a red light indicating an error. In addition, the integrity status indicator value may be updated accordingly to reflect the failed status of the integrity check. In step 310, the image input device 124 may end the session without capturing and/or sending image data.

Meanwhile, if (in step 306) the integrity of the device 124 is found to not have been compromised, then the device 124 may communicate (in step 312) with the personal computing device 102 with a ready state indication. For example, the ready state indication may be the integrity status indicator value set to indicate a successful self-test. In step 314, the personal computing device 102 and the image input device 124 may perform an electronic handshake to establish a secure session. In one embodiment, the personal computing device 102 and image input device 124 may establish a secure communication channel (e.g., using secure socket layer (SSL) communication) over a hardwire connection and logically remove the image input device 124 from the USB communication port. In effect, the image input device 124 may be shielded from malware (or other malicious software) accessing the device 124 through the personal computing device's 102 operating system USB communications port.

Alternatively, in one embodiment the user may provide login information (e.g., username and password) to the server computing device 202 and be authenticated (in step 316) for a secure session to transmit image data. If the server computing device 202 does not have line-of-sight with the image input device 124 (in step 318), then an error message may be displayed to the user. The user may be provided with instructions to attempt to troubleshoot the error, however, the server computing device 202 may not, in some embodiments, accept the image data with such an error message outstanding.

Assuming the server computing device 202 is able to successfully authenticate the image input device 124 and acquire line-of-sight (in step 318), then in step 322, the transfer of the image data to the server computing device 202 is initiated over the secure channel. In one embodiment in accordance with aspects of the invention, the integrity of the secure channel may be further tested. In such an embodiment, the server computing device 202 may previously issue a one-time key to the image input device 124. The key may be used to hash or "steg" (using image steganography) a key value into the image data transferred over the secure channel. As such, the server computing device 202 may detect any malicious alteration taking place between the transmission by the image input device 124 and receipt by the server computing device 202. In one example, the detection occurs when the hashed or "stegged" key is destroyed in the image data.

Alternatively, in yet another example, the server computing device 202 may directly pass a one-time key to the image input device 124 before or during system startup. As such, the image input device 124 may need to access a network interface card (or any other communications hardware) to allow the image input device 124 to receive the key from the server computing device 202. In such an embodiment where a personal computing device 102 is part of the communication channel between the image input device 124 and the server computing device 202, the image input device 124 may bypass an operating system on the personal computing device 102. In other words, during reboot of the personal computing device 102, the appropriate buses, ports, and/or other components (e.g., USB and NIC) may be activated before the operating system is fully functional and vulnerable to possible malware. By initiating the components, the image input device 124 may communication directly with the server computing device 202 over network 210 to issue a key (e.g., a one-time key) to the image input device 124. As such, the personal computing device 102 is unable to intercept or interfere with the transmission of the key. Implementation of such an embodiment may require an initial registration process to store the necessary instructions in the firmware of the image input device 124 and register it as an active, recognized device for communication with the server computing device 202.

Once the image data is transmitted to the server computing device 202, the data may be saved in a data storage unit 208 and the session may conclude (in step 324). One skilled in the art will appreciate that the aforementioned description relates to a single embodiment of the invention, and that other features and aspects may be added or removed from the aforementioned embodiment while remaining within the spirit of the invention.

Figure 4:
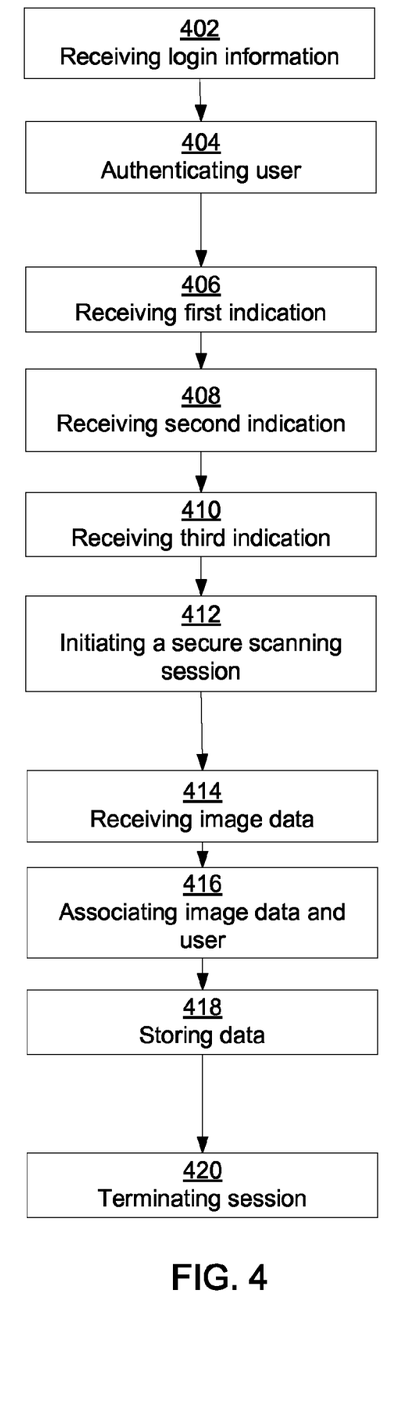
FIG. 4 shows a flowchart illustrating a method for a server machine to verify a communication channel for image transmission in accordance with various aspects of the invention.

FIG. 4 shows a flowchart illustrating a method for a server machine to verify a communication channel for image transmission in accordance with various aspects of the invention. In step 402, a server computing device 202 may receive login information (e.g., username, password, account number, social security number, personal identification number (PIN), etc.) of a user of a personal computing device 102 connected to an image input device 124. In one example, the user may enter the login information through a webpage on a web browser. The server computing device 202 may authenticate (in step 404) the user using the login information. The server computing device 202 may request and receive (in step 406) an indication from the personal computing device 102 indicating that the personal computing device 102 does not includes malware. As explained earlier, the indication may be generated by malware detection software on the personal computing device and stored as a datafile and/or timestamp value. In step 408, the server computing device 202 may receive an indication that a secure communication channel has been established between the image input device 124 and the personal computing device 102. The secure communication channel may have been established after an electronic handshake between the image input device 124 and the personal computing device 102. One skilled in the art will appreciate that in an embodiment where no personal computing device 102 is present between the image input device 124 and the server computing device 202, step 406 and step 408 may be optional and/or modified accordingly.

In step 410, the server computing device 202 may attempt to establish a line-of-sight with the image input device 124 (similar to step 318 in FIG. 3), and receive an indication that line-of-sight is available to the image input device 124. In one example, line-of-sight exists when, among other things, it is determined that there is no spoofing and no in-line devices intercepting the communication between the devices. The line-of-sight enables the server computing device 202 to authenticate the image input device 124 so that a command indicating that secure scanning session has been confirmed may be sent (in step 412). The command may be a simple Boolean true or false value or any other predetermined indication that an secure scanning session has been established. The server computing device may receive (in step 414) the image data generated by the image input device 124 during the secure scanning session. In step 416, the image data and the user (e.g., user information) may be associated. Subsequently, in step 418, the data may be stored in a data storage unit 208. In some embodiments, the secure scanning session may terminate (in step 420) after the image data is received and stored.

One skilled in the art will appreciate that, in accordance with aspects of the invention, the image input device 124 may be a digital camera 218, multi-function office device 216 with scanning capabilities, and/or an automated teller machine (ATM) or kiosk 220 with check scanning capabilities. For example, an ATM 220 with a processing unit 222 (e.g., a microcontroller, microprocessor, etc.), memory 224 (e.g., non-volatile memory, ROM, etc.), input devices 226 (e.g., image input devices 122, etc.), and output devices 228 (e.g., visual display, printer, etc.) may be used as a substitute in one or more embodiment described above including a personal computing device 102 and image input device 124. In addition, in image input devices such as digital camera 218 and multi-function office device 216, the image input device may be directly addressable by a server computing device 202 without a personal computing device 102. As explained with regards to FIG. 4, the process of establishing and transmitting image data may be adjusted accordingly.

In another example including a mobile (or handheld) image input device (e.g., a mobile phone with a digital camera 218), triangulation data from a radio tower of the mobile telecommunication network (e.g., GSM communications network) may be retrieved from the data stream and used as a geo-location data to authenticate the user. For example, the geo-location data may be compared to a known geographic profile of the user to determine whether the device 218 is located in an unknown location. In such cases, it ma be likely that the device 218 and image being transmitted are not legitimate and further authentication may be required before the integrity of the image can be confirmed. One skilled in the art will appreciate that the cellular data (e.g., base station identification, etc.) may be extracted using known methods such as those using Location API (as made available by Sun Microsystems) or as was done by the Massachusetts Institute of Technology's media lab. The data provide in messages in the data stream to the mobile device from the radio tower (e.g., BTS tower) may be retrieved and used in accordance with aspects of the invention.

Although not required, one of ordinary skill in the art will appreciate that various aspects described herein may be embodied as a method, a data processing system, or as a computer-readable medium storing computer-executable instructions. For example, a computer-readable medium storing instructions to cause a processor in an electronic check scanner device to perform steps of a method in accordance with aspects of the disclosure is contemplated.

In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A system, comprising:
   an image input device, comprising:
      an input device memory storing first computer-executable instructions and an integrity status indicator value; and
      an input device processing unit for executing the first computer-executable instructions to perform a first method comprising:
         performing a test to detect whether the input device memory is infected with malware;
         updating the integrity status indicator value according to the test; and
         sending the integrity status indicator value to a personal computing device;
   the personal computing device connected to the image input device, comprising:
      a personal computing device memory storing second computer-executable instructions; and
      a personal computing device processor for executing the second computer-executable instructions to perform a second method comprising:
         sending a request for image data to the image input device;
         receiving the image data from the image input device; and
         receiving the integrity status indicator value; and
   a server computing device in communication with the image input device over a network and through the personal computing device, comprising:
      a server computing device memory storing information corresponding to an Internet-accessible webpage; and
      a server computing device processor for executing third computer executable instructions to perform a third method comprising:
         sending the information corresponding to the Internet-accessible webpage to the personal computing device; and
         receiving the image data from the personal computing device after determining that a line-of-sight exists between the server computing device and the image input device, wherein the line-of-sight exists when communications between the server computing device and the image input device are not intercepted by one or more in-line devices.

2. The system of claim 1, where the second computer-executable instructions include malware detection software, and the personal computing device further comprising:
 a datafile stored in the personal computing device memory to indicate whether the personal computing device includes malware; and
 a timestamp value stored in the personal computing device memory to indicate when the malware detection software was last run on the personal computing device.

3. The system of claim 1, where the second computer-executable instructions include instructions corresponding to a thin-client application configured to communicate with the server computing device.

4. The system of claim 1, where the first computer-executable instructions comprise instructions for causing the image input device to perform an electronic handshake with the personal computing device to establish a secure channel before sending image data to the personal computing device.

5. The system of claim 1, where the image input device comprises an electronic paper check scanner, and the server computing device comprises a data storage unit configured to store the image data of a paper check.

6. A method, comprising:
 (a) receiving, a server computing device, a first indication that a personal computing device includes no malware, the first indication being generated by malware detection software on the personal computing device;
 (b) receiving, the server computing device, a second indication that a secure communication channel is established between an image input device and the personal computing device, the secure communication channel being established after an electronic handshake between the image input device and the personal computing device;
 (c) receiving, by the server computing device, a third indication that a line-of-sight exists between the server computing device and the image input device, wherein the line-of-sight exists when communications between the server computing device and the image input device are not intercepted by one or more in-line devices;
 (d) after performing (a), (b), and (c), sending, by the server computing device, a command to initiate a secure scanning session; and
 (e) receiving, the server computing device, image data generated by the image input device during the secure scanning session.

7. The method of claim 6, comprising:
 receiving, the server computing device, login information of a user of a personal computing device connected to an image input device;
 authenticating, the server computing device, the user using the login information;
 associating, by the server computing device, the user and the image data received during the secure scanning session; and
 storing, by the server computing device, the image data in a data storage unit.

8. The method of claim 7, where the image input device comprises an electronic check scanner.

9. The method of claim 7, where the image input device comprises a digital camera.

10. A method, comprising:
 (a) receiving, by a computing device, a first indication that a image input device includes no malware, the first indication being generated by computer-executable instructions stored in a memory in the image input device;
 (b) authenticating, by the computing device, the image input device by performing an electronic handshake with the image input device;
 (c) after (a) and (b), establishing, by the computing device, a secure communication channel with the image input device
 (d) sending, by the computing device, a command to initiate a secure scanning session;
 (e) receiving, by the computing device, image data generated by the image input device during the secure scanning session;
 (f) storing, by the computing device, the image data in a data storage unit; and
 (g) transmitting, by the computing device, to a server computing device, a second indication that a line-of-sight exists between the server computing device and the image input device, wherein the line-of-sight exists when communications between the server computing device and the image input device are not intercepted by one or more in-line devices.

11. The method of claim 10, where a non-volatile memory in the image input device stores a unique identifier corresponding to the image input device.

12. The method of claim 10, where the unique identifier includes an IP address and the image input device comprises an electronic paper check scanner.

13. The method of claim 10, comprising generating a key for use in performing the electronic handshake with the image input device.

* * * * *

UNITED STATES PATENT AND TRADEMARK OFFICE
CERTIFICATE OF CORRECTION

| | | |
|---|---|---|
| PATENT NO. | : 7,971,059 B2 | |
| APPLICATION NO. | : 11/755543 | |
| DATED | : June 28, 2011 | |
| INVENTOR(S) | : Matthew Alexander Calman et al. | |

It is certified that error appears in the above-identified patent and that said Letters Patent is hereby corrected as shown below:

Column 11, Claim 6, Line 28:
    Delete "a server computing device" and insert -- by a server computing device --

Column 11, Claim 6, Line 32:
    Delete "the server computing device" and insert -- by the server computing device --

Column 11, Claim 6, Line 48:
    Delete "the server computing device" and insert -- by the server computing device --

Column 12, Claim 7, Line 2:
    Delete "the server computing device" and insert -- by the server computing device --

Column 12, Claim 7, Line 5:
    Delete "the server computing device" and insert -- by the server computing device --

Signed and Sealed this
Eleventh Day of October, 2011

David J. Kappos
*Director of the United States Patent and Trademark Office*